US009189128B2

(12) United States Patent
McConnell et al.

(10) Patent No.: US 9,189,128 B2
(45) Date of Patent: Nov. 17, 2015

(54) GRAPHICALLY MANAGING ELECTRONIC COMMUNICATIONS

(71) Applicant: Verizon Patent and Licensing Inc., Basking Ridge, NJ (US)

(72) Inventors: James T. McConnell, Keller, TX (US); Anthony Lemus, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 353 days.

(21) Appl. No.: 13/761,487

(22) Filed: Feb. 7, 2013

(65) Prior Publication Data

US 2014/0218391 A1 Aug. 7, 2014

(51) Int. Cl.
*G06F 3/0481* (2013.01)
*G06Q 10/10* (2012.01)

(52) U.S. Cl.
CPC .......... *G06F 3/04817* (2013.01); *G06Q 10/107* (2013.01)

(58) Field of Classification Search
None
See application file for complete search history.

(56) References Cited

PUBLICATIONS

"IBM i2 Analyst's Notebook", IBM Software Industry Solutions, IBM Corporation, Nov. 2012, 4 pages.

*Primary Examiner* — Scott Baderman
*Assistant Examiner* — Asher Kells

(57) ABSTRACT

One or more devices may receive information associated with multiple electronic communications intended for a user; identify attributes of the multiple electronic communications; determine, based on the attributes, display data for displaying representations of multiple electronic communications; and cause, based on the display data, the representations of the, multiple electronic communications to be displayed as a graphical display of icons arranged in a particular graphical structure in which the icons are connected via links. The icon may correspond to the representation of an electronic communication. The icon may be presented within the graphical display to visually indicate, to the user, an attribute of the electronic communication.

20 Claims, 7 Drawing Sheets

GRAPHICALLY MANAGING ELECTRONIC COMMUNICATIONS

BACKGROUND

Electronic communications, such as e-mails, are sometimes presented in a client application running on a user device. Electronic communications are sometimes presented in a list or text format and can be organized based on a date received, a sender of the electronic communication, a subject of the electronic communication, or based on some other parameter. Electronic communications, presented in a list or text format, can be cumbersome to manage.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may display information representing electronic communications, such as e-mails, short message service (SMS) text messages, multimedia service (MMS) messages, visual voicemail messages, and/or some other type of electronic communication, in a graphical manner. For example, the systems and/or methods may display the information representing electronic communications in a graphical organization style chart or some other type of graphical manner.

Figure 1:
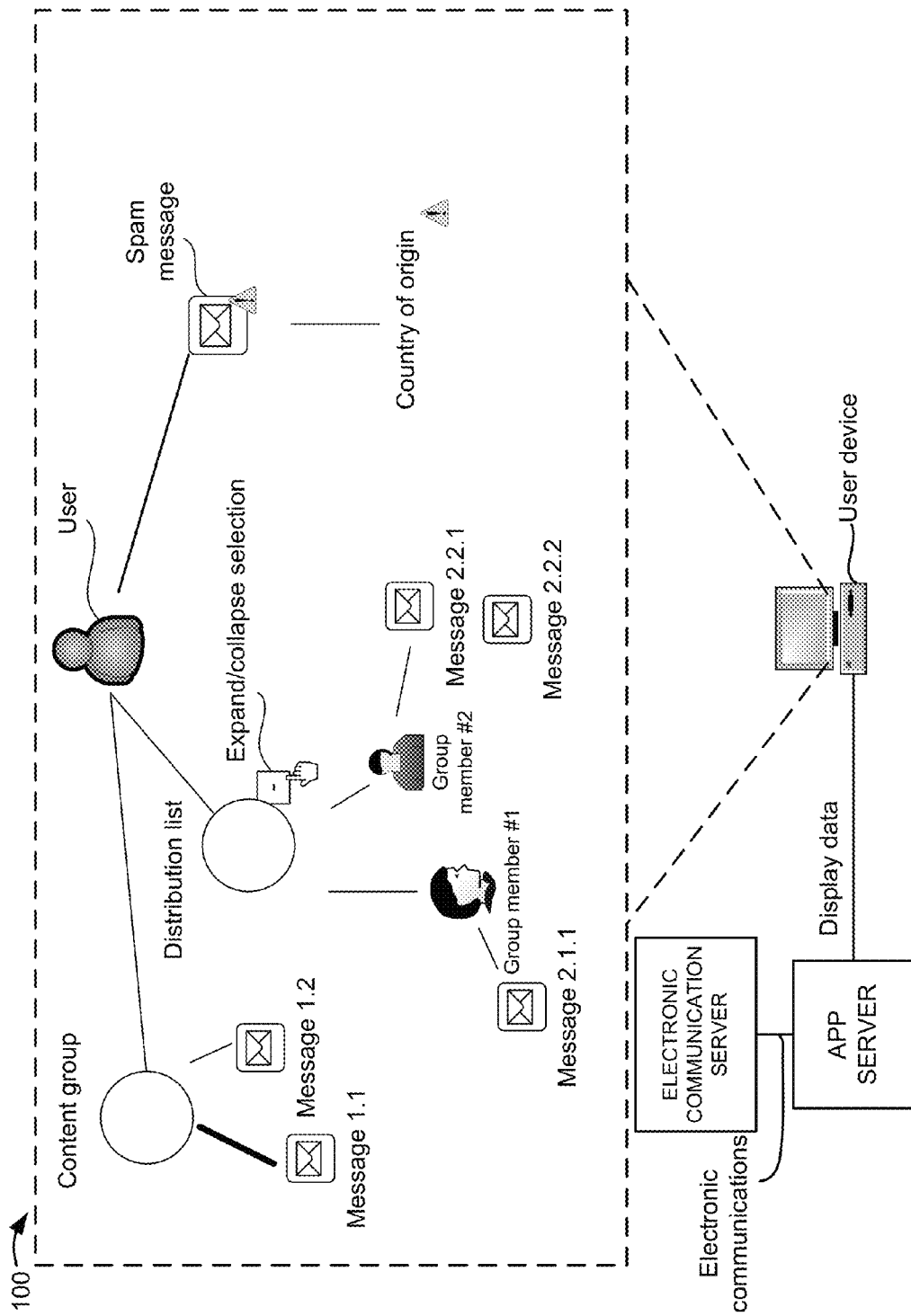
FIG. 1 illustrates an example overview of an implementation described herein.

FIG. 1 illustrates an example overview of an implementation described herein. In FIG. 1, assume that an electronic communication server stores one or more electronic communications associated with a particular user of a user device. In some implementations, an application server (referred to as an "app server") may receive data, associated with the electronic communications, and may determine attributes associated with each electronic communication (e.g., a sender of the electronic communication, a domain associated with the electronic communication, content of the electronic communication, a geographic location from which the electronic communication was sent, information associated with a recipient of the electronic communication, etc.).

In some implementations, the app server may apply one or more rules to the electronic communications and/or weighting information to each electronic communication to prioritize and organize the electronic communications based on the attributes of the electronic communications. For example, the app server may apply a rule to attach a particular image or icon to a particular electronic communication received by a particular sender. Additionally or alternatively, the app server may apply a rule to identify a geographic location associated with an electronic communication when the electronic communication is received from an unknown domain or when the electronic communication is identified as spam. In some implementations, the app server may generate display data to instruct a user device to display the electronic communication in a graphical manner and in a manner corresponding to the applied rules and/or weighting information.

As shown in interface 100 of FIG. 1, the app server may provide the display data to the user device. In FIG. 1, assume that a particular user is associated with electronic communications received by the app server and that the user device uses the display data to display information representing the electronic communications in interface 100. In the example of interface 100, the information representing electronic communications may be displayed in groups. For example, the electronic communications may be grouped based on content of the electronic communications (e.g., electronic messages relating to similar subjects, such as electronic messages pertaining to a particular sports team, a particular news event, etc.). Additionally, or alternatively, the electronic communications may be grouped based on a distribution list, based on being identified as spam, based on geographic locations from which the electronic communications were sent, or based on some other parameter.

As further shown in interface 100, information representing electronic communications may be displayed in subgroups, such as electronic communications associated with particular members of a distribution list. For example, as shown in interface 100, electronic communications may be grouped by a distribution list, and may be further grouped by subgroups, such as by electronic communications associated with the members of the distribution list (e.g., group member #1 and group member #2).

In some implementations, the electronic communications within a group or within a subgroup may be prioritized based on electronic communication content. As an example, assume that the electronic communication "message 2.2.1" includes content relating to a meeting agenda and that the electronic communication "message 2.2.2" includes content relating to a website that publishes jokes. The electronic communication "message 2.2.1" may be prioritized over the electronic communication "message 2.2.2." In some implementations, an icon or image, representing the electronic communication, may be resized, relocated on the display of the user device, to modify the priority of the electronic communication. Additionally or alternatively, the color of the icon or image may be modified to modify the priority of the electronic communication. Additionally, or alternatively, the electronic communications may be prioritized based on some other factor.

In some implementations, groups and/or subgroups may be identified by an icon or an image that may be descriptive of the group or subgroup (e.g., a portrait of an individual, a company logo, a sports team logo, a flag representing a geographical location, a map representing a geographical location, etc.). For example, as shown in FIG. 1, interface 100 may identify a country of origin of an electronic communication identified as spam.

In some implementations, a user of the user device may interact with interface 100 to expand or collapse a group, re-arrange the groups, subgroups, or electronic communications, or interact with interface 100 in some other manner.

For example, a user may identify and organize information representing electronic communications in a graphical manner, thereby creating a visual representation of the user's electronic communications. Further, the user may interact with interface 100 to customize the display and presentation of information representing electronic communications, thereby allowing the user to manage, identify, and/or organize electronic communications more effectively than when electronic communications are presented in a list or text format.

While the systems and/or methods are described as an app server providing display data to a user device, in practice, the systems and/or methods are not so limited. For example, the user device may receive electronic communications directly from the electronic communication server and may determine display data independently of the app server. In some implementations, the user device may include an application to determine display data, display and organize information representing electronic communications based on the display data, receive user input via interface 100, and/or update the display data based on the user input.

While FIG. 1 shows a particular format of an interface for displaying information representing electronic communications in a graphical format, interface 100 shown in FIG. 1 is merely an example and that in practice, interface 100 may appear different and may have a different format that what is shown in FIG. 1. For example, an interface for displaying information representing electronic communications may be displayed in an organizational style chart format, such as a peacock diagram format, a hub and spoke diagram format, a hierarchical diagram format, or some other format. The manner of display may be selected, for example, by the user of the user device.

Figure 2:
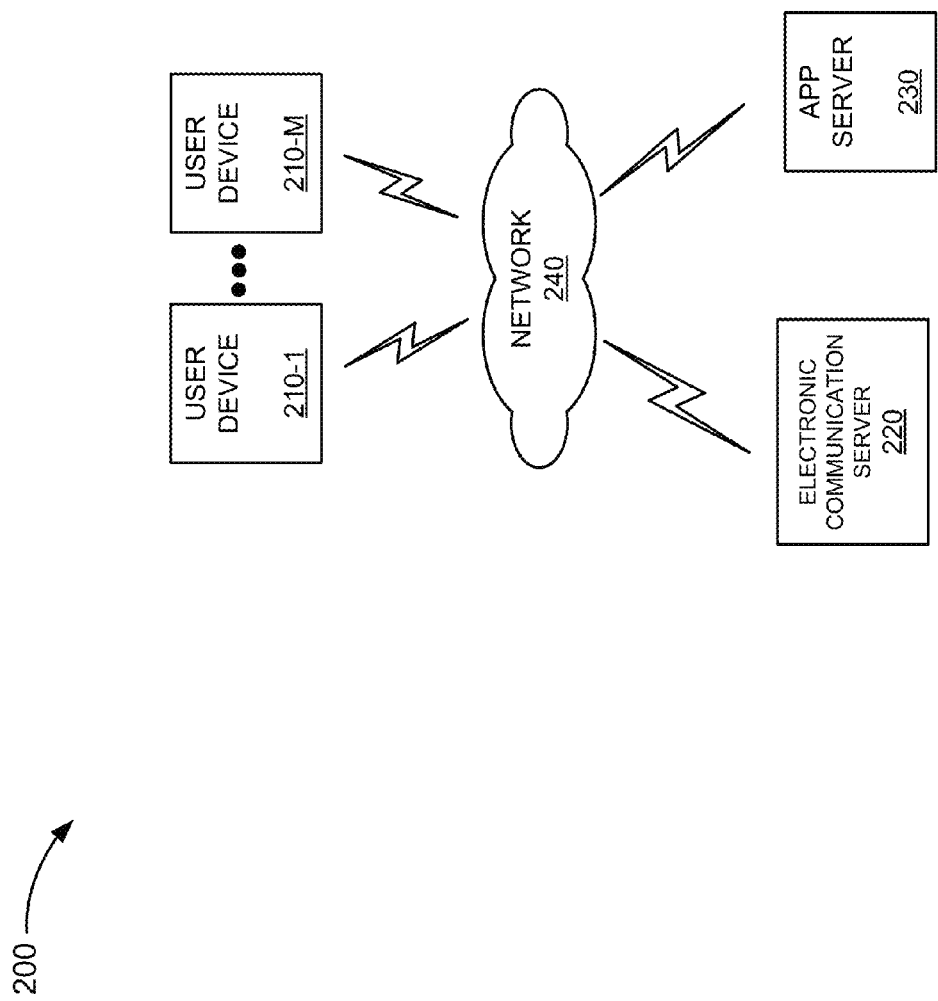
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), electronic communication server 220, app server 230, and network 240.

User device 210 may include any device capable of communicating via a network, such as network 240. For example, user device 210 may correspond to a mobile communication device (e.g., a smart phone or a personal digital assistant (PDA)), a portable computer device (e.g., a laptop or a tablet computer), a gaming device, a set-top box, a desktop computing device, or another type of device. In some implementations, user device 210 may communicate with app server 230 to receive display data in order to display information representing electronic communications in a graphical manner via a user interface of user device 210. In some implementations, user device 210 may provide, to app server 230, weighting information and/or rules information to allow app server 230 to form display data based on the weighting information and/or the rules information. For example, user device 210 may present information regarding electronic communications based on the display data.

Electronic communication server 220 may include one or more computing devices, such as a server device or a collection of server devices. In some implementations, electronic communication server 220 may correspond to an e-mail server, an SMS server, an MMS server, a visual voicemail server, or some other type of server used to facilitate the delivery of electronic communications between multiple user devices 210. For example, electronic communication server 220 may communicate with user device 210 in order to deliver an electronic communication from user device 210 to another user device 210. In some implementations, electronic communication server 220 may store electronic communications and may provide information relating to electronic communications to app server 230.

App server 230 may include one or more computing devices, such as a server device or a collection of server devices. In some implementations, app server 230 may receive weighting information and/or rules information from user device 210 and may receive information regarding electronic communications from electronic communication server 220. As described above, app server 230 may form display data to define a manner in which electronic communications may be displayed in a user interface of user device 210.

In some implementations, user device 210 may perform one or more, or all, of the functions of app server 230. In some implementations, electronic communication server 220 may perform one or more, or all, of the functions of app server 230.

Network 240 may include one or more wired and/or wireless networks. For example, network 240 may include a cellular network, a public land mobile network (PLMN), a second generation (2G) network, a third generation (3G) network, a fourth generation (4G) network, a fifth generation (5G) network, and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
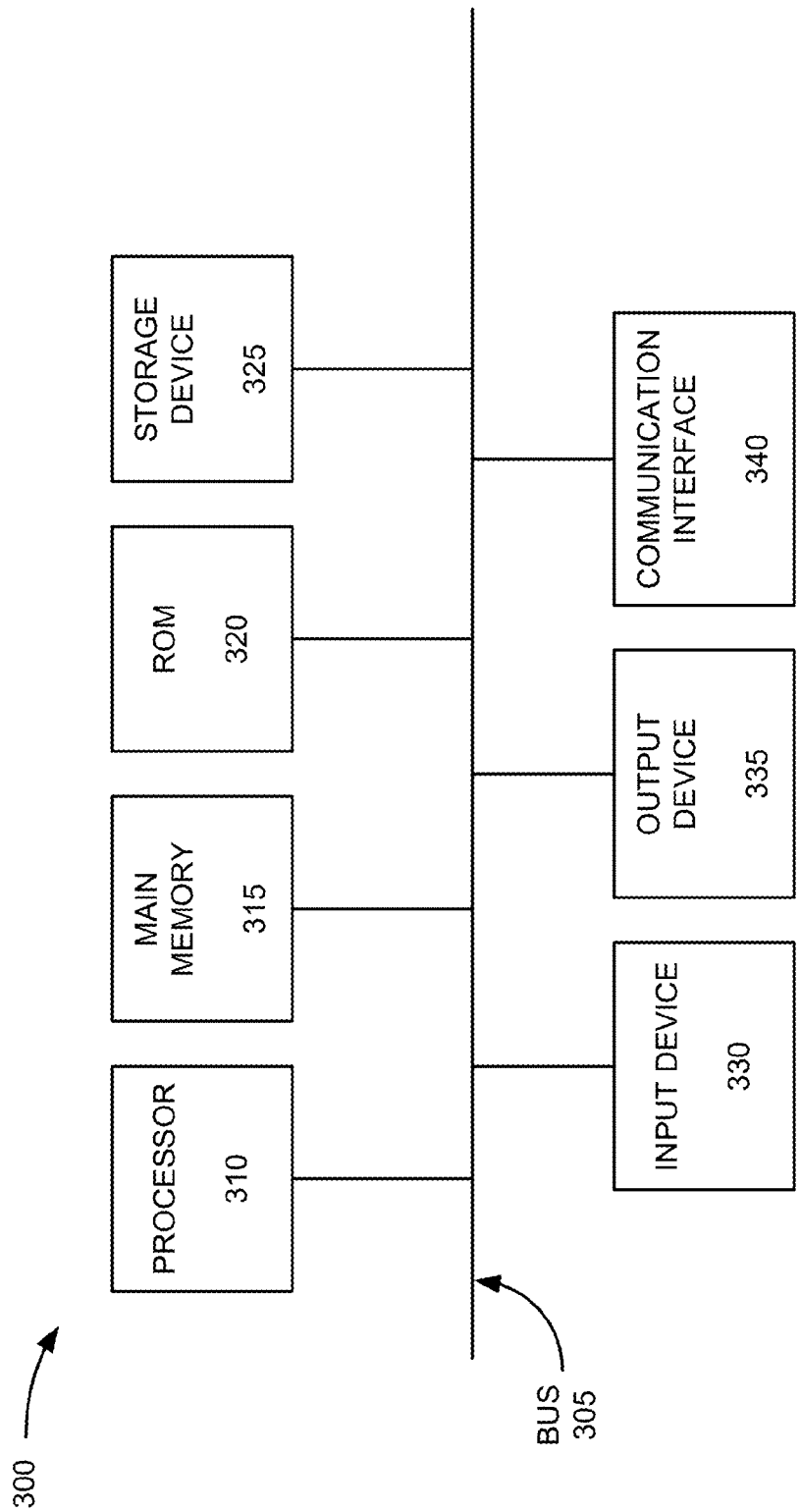
FIG. 3 illustrates example components of a device that may be used within the environment of FIG. 2.

FIG. 3 illustrates example components of a device 300 that may be used within environment 200 of FIG. 2. Device 300 may correspond to user device 210, electronic communication server 220, or app server 230. Each of user device 210, electronic communication server 220 or app server 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device.

Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
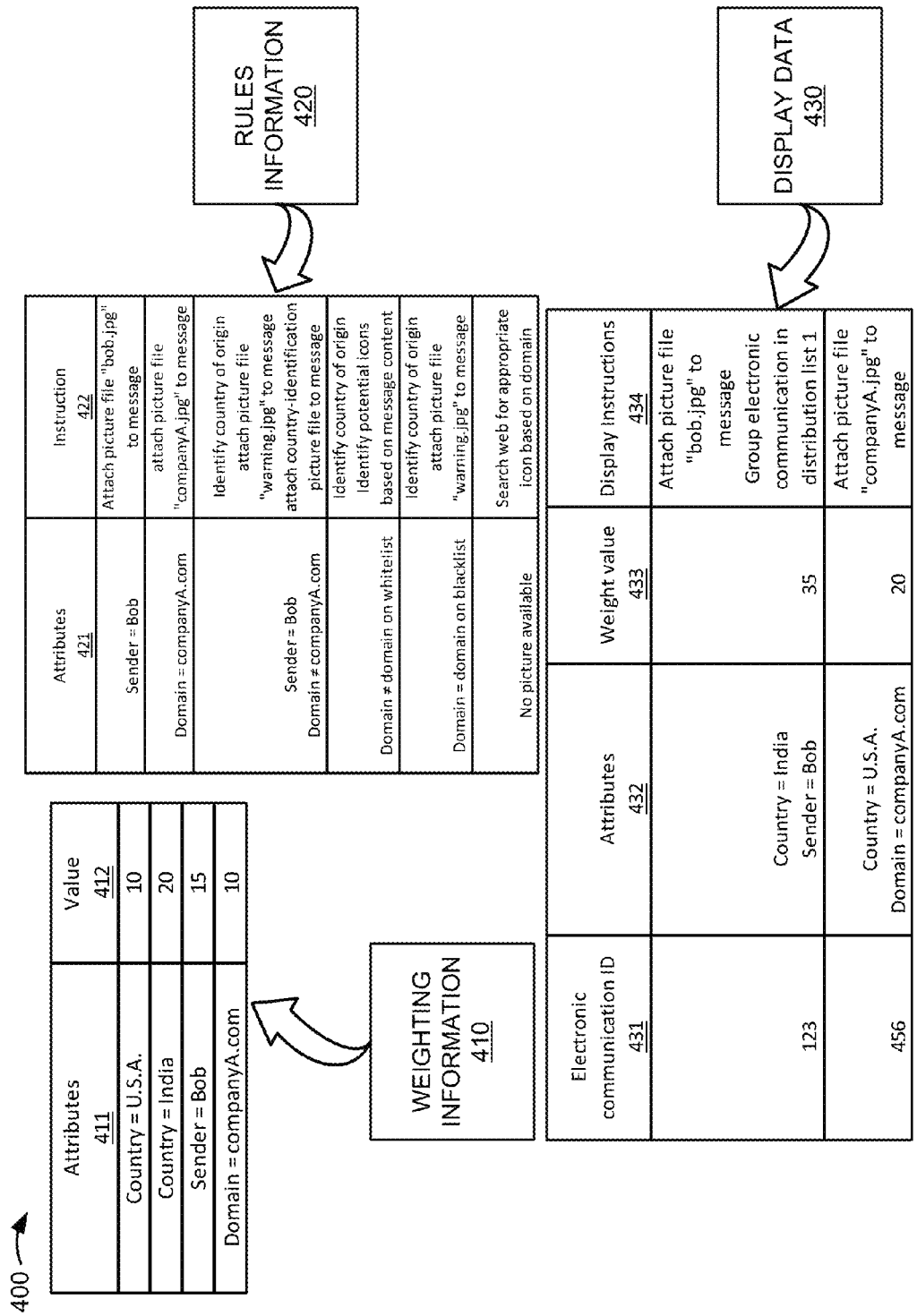
FIG. 4 illustrates example data structure that may be stored by one or more devices in the environment of FIG. 2.

FIG. 4 illustrates an example data structure 400 that may be stored by one or more devices in environment 200, such as app server 230. In one implementation, data structure 400 may be stored in a memory of app server 230. In another implementation, data structure 400 may be stored in a memory separate from, but accessible by, app server 230. In some implementations, data structure 400 may be stored by some other device in environment 200, such as electronic communication server 220 or user device 210.

A particular instance of data structure 400 may contain different information and/or fields than another instance of data structure 400. In some implementations, data structure 400 may store display preference information associated with a user of a particular user device 210. Another instance of data structure 400 may store display preference information for a user of another user device 210. In some implementations, app server 230 may form display data information on information stored by data structure 400. As described above, user device 210 may display electronic communications in accordance with display data provided by app server 230.

As shown in FIG. 4, data structure 400 may include weighting information field 410, rules information field 420, and display data field 430.

Weighting information field 410 may include information used to score, prioritize, or weight a particular electronic communication. For example, weighting information field 410 may include information to identify a value to add to a score of an electronic communication having a particular attribute. As shown in FIG. 4, weighting information field 410 may include attributes field 411 having information to identify an attribute of an electronic communication (e.g., a geographic location from which the electronic communication was sent, a sender of the electronic communication, a domain of the electronic communication, a carbon copy (CC) recipient of the electronic communication, an internet protocol (IP) address associated with the electronic communication, etc.). Weighting information field 410 may also include value field 412 to identify a value to add to (or otherwise adjust) a score of an electronic communication having a corresponding attribute. As described above, app server 230 may score an electronic communication based on information stored by weighting information field 410. An example of scoring an electronic communication is described below with respect to display data field 430.

In some implementations, information stored by weighting information field 410 may be received from a user of user device 210 (e.g., via a user interface, of user device 210, that displays information representing electronic communications). In some implementations (e.g., when the user of user device 210 has not provided the weighting information, such as on a first-run of the user interface), weighting information field 410 may store default weighting information received from a user of app server 230 (e.g., via a portal or interface that receives the default weighting information). As described in greater detail below, information and/or icons representing electronic communications may be displayed based on information stored by weighting information field 410.

Rules information field 420 may include information to identify a rule to apply to an electronic communication having a particular attribute. As shown in FIG. 4, rules information field 420 may include attributes field 421 having information to identify an attribute of an electronic communication, and may also include instruction field 422 having information to identify a rule to apply to an electronic communication having a corresponding attribute. In some implementations, instruction field 422 may identify a rule to direct user device 210 to display information representing an electronic communication in a particular manner. For example, instruction field 422 may identify a rule to attach a picture file, corresponding to a particular sender, to the electronic communication when the electronic communication is sent by the particular sender.

Additionally, or alternatively, instruction field 422 may identify a rule to attach, to the electronic communication, a picture file of a logo of a particular company when the electronic communication is sent from a domain of the particular company. Additionally, or alternatively, instruction field 422 may identify a rule to identify an image file to attach to the electronic communication when an image file is not associated with the particular electronic communication (e.g., when the electronic communication is received from a sender or domain that does not have an associated image file). For example, app server 230 may perform a web search to identify an image file to attach to the electronic communication based on the contents of the electronic communication, a domain of the electronic communication, a geographic location associated with the electronic communication, etc.

In some implementations, app server 230 may identify a social networking website (e.g., based on a link to the website and/or login credentials provided by a user of user device 210 and/or a user of app server 230) and perform a search on the social networking website to identify the image file (e.g., to identify a company logo associated with a particular sender of the electronic communication). Additionally, or alternatively, app server 230 may perform a social network analysis to identify relationship information between a recipient and a sender of the electronic communication. For example, app server 230 may perform a search on social networking website, associated with the user of the electronic communication, to identify a group (e.g., a group of friends, family, co-workers, etc.), an image, or some other information associated with a sender of an electronic communication, In some implementations, instruction field 422 may identify a rule based on the content of an electronic communication. For example, instruction field 422 may identify a rule to group electronic communications that include some particular text or that relate to a particular subject. Additionally, or alternatively, instruction field 422 may identify a rule to mark an electronic communication as a potentially harmful electronic communication based on the content of electronic communication and/or based on an originating geographic location of the electronic communication.

In some implementations, app server 230 may automatically identify a default set of attributes associated with an electronic communication. For example, app server 230 may automatically identify a domain associated with the electronic communication, a sender of the electronic communication, an IP address of the electronic communication, etc. In some implementations, instruction field 422 may store information to direct app server 230 to identify secondary attributes of the electronic communication based on the default attributes. For example, instruction field 422 may store an instruction to direct app server 230 to identify a secondary attribute associated with the electronic communication (e.g., a country of origin) when the electronic communication is associated with a particular default attribute (e.g., when the domain of the electronic communication is not on a domain white list or when the domain of the electronic communication is on a domain black list). In some implementations, default and secondary attributes may vary from what is described above and may be based on input received from a user of user device 210 and/or a user of app server 230. In some implementations, the default and secondary attributes may vary for different electronic communications.

Display data 430 may include information to identify display data that user device 210 may use to display electronic communications in a particular manner, for example, in a manner described above with respect to interface 100 of FIG. 1. In some implementations, app server 230 may generate information in display data field 430 based on information stored by weighting information field 410 and/or rules information field 420.

As shown in FIG. 4, display data field 430 may include electronic communication ID field 431, attributes field 432, weight value field 433, and display instructions field 434. Electronic communication ID field 431 may store a string of characters to uniquely identify a particular electronic communication stored by electronic communication server 220 and destined for a user of user device 210. Attributes field 432 may store information to identify attributes of the particular electronic communication corresponding to a particular electronic communication ID. For example, as described above, app server 230 may identify a default set of attributes and a secondary set of attributes associated with the electronic communication.

Weight value field 433 may store a value corresponding to a score of a particular electronic communication. As described above, app server 230 may score an electronic communication based on an attribute of the electronic communication and based on a corresponding value associated with the attribute. As an example, assume that the electronic communication having the electronic communication ID of "123" was sent from an origin country of India and was sent from the sender "Bob." Further, assume that a value of 20 applies to electronic communications sent from India and a value of 15 applies to electronic communications sent from Bob. Given these assumptions, app server 230 may determine a score value of 35 for the electronic communication having the electronic communication ID of "123." Further, electronic communication ID field 431 may store the electronic communication ID "123," attributes field 432 may store the attributes "country=India, sender=Bob," and weight value field 433 may store the value 35.

Display instructions field 434 may store information to identify instructions to direct user device 210 to display a particular electronic communication or group of electronic communications in a particular manner. For example, display instructions field 434 may store information to direct user device 210 to display the electronic communication having the electronic communication ID "123" with a picture file representative of a sender of the electronic communication (e.g., the picture file "bob.jpg"). Additionally, or alternatively, display instructions field 434 may store information to direct user device 210 to group the electronic communication having the electronic communication ID "123" in a particular group of electronic communications associated with a distribution list. For example, a user of user device 210 may input instructions (e.g., instructions stored by rules information field 420) that identify how to group multiple electronic communications based on attributes of the multiple electronic communications (e.g., the user may input an instruction to group electronic communications received from a particular sender in a particular distribution list). In some implementations, display instructions field 434 may identify a display instruction for a particular electronic communication based on the attributes of the particular electronic communication and based on information stored by rules information field 420.

In some implementations, display instructions field 434 may store other information not shown in data structure 400. For example, display instructions field 434 may store information to direct user device 210 to group electronic communications in a particular manner (e.g., group multiple electronic communications sent by a particular sender, electronic communications associated with a particular domain, electronic communications associated with a particular geographic location, electronic communications having similar contents, electronic communications having similar subjects, electronic communications associated with a particular distribution list, etc.).

Additionally, or alternatively, display instructions field 434 may store information to direct user device 210 to display information representing an electronic communication or multiple electronic communications in some other manner (e.g., create a link between an image representative of a user of user device 210 and an image representative of an electronic communication sent to the user, adjust the thickness of the link based on the size of the electronic communication and/or the score value of the electronic communication, adjust the size of an image representative of a group of electronic communications based on the number of electronic communications in the group and/or a cumulative score value of the electronic communications, adjust a color of text identifying a sender of an electronic communication, etc.). Additionally, or alternatively, display instructions field 434 may store grid coordinates to identify a location on the display of user device 210 to display the image representing the electronic communication.

As described above, information stored by weighting information field 410 and/or rules information field 420 may correspond to default weighting or rules information received by an operator of app server 230. Thus, information stored by display data field 430 may be based on the default weighting or rules information. Further, user device 210 may display information representing an electronic communication in a default presentation in a user interface of user device 210. As later described, a user of user device 210 may interact with the user interface to modify information stored by display data field 430. Additionally, or alternatively, information stored by weighting information field 410 and/or rules information field 420 may correspond to weighting or rules information received by a user of user device 210.

While particular fields are shown in a particular format in data structure 400, in practice, data structure 400 may include additional fields, fewer fields, different fields, or differently arranged fields than are shown in FIG. 4. Further, the format of information stored by the fields in data structure 400 may vary from what is shown in FIG. 4. For example, data structure 400 may include fields to store information that identify a domain white list or a domain black list.

Figure 5:
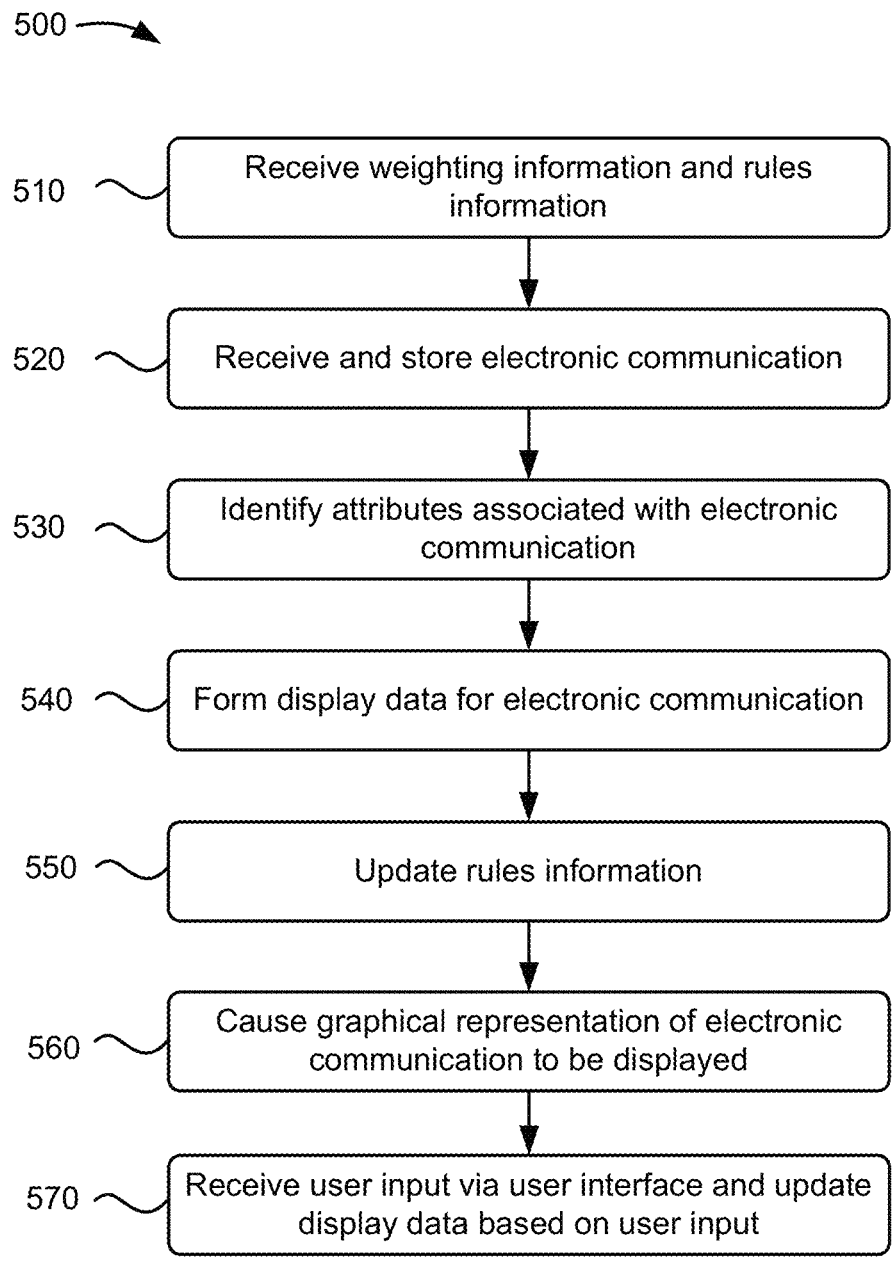
FIG. 5 illustrates a flowchart of an example process for providing display data to allow a user device to display electronic communications in a graphical manner.

FIG. 5 illustrates a flowchart of an example process 500 for providing display data to allow a user device to display electronic communications in a graphical manner. In one implementation, process 500 may be performed by one or more components of app server 230. In another implementation, some or all of blocks of process 500 may be performed by one or more components of another device in environment 200 (e.g., electronic communication server 220 or user device 210), or a group of devices including or excluding app server 230.

As shown in FIG. 5, process 500 may include receiving weighting information and rules information (block 510). For example, app server 230 may receive weighting information and rules information from user device 210 via a user interface of user device 210. In some implementations, the weighting information and the rules information may correspond to information stored by weighting information field 410 and/or rules information field 420. For example, user device 210 may be used to input values and/or instructions relating to the weighting information and/or the rules information into weighting information field 410 and/or rules information field 420. As later described, a user of user device 210 may interact with an interface of user device 210 to provide or update the weighting information and/or the rules information. In some implementations, the weighting information and/or the rules information may correspond to default values and/or default instructions provided by an operator of app server 230.

Process 500 may also include receiving and storing an electronic communication (block 520). For example, app server 230 may receive an electronic communication, or information regarding the electronic communication, from electronic communication server 220 when a particular user device 210 sends the electronic communication to another user device 210. For example, app server 230 may receive authentication information from user device 210, and may provide, to electronic communication server 220, the authentication information to receive the electronic communication from electronic communication server 220. In some implementations, app server 230 may store the electronic communication based on receiving the electronic communication from electronic communication server 220.

Process 500 may further include identifying attributes associated with the electronic communication (block 530). For example, as described above, app server 230 may identify a set of default attributes associated with the electronic communication (e.g., a domain associated with the electronic communication, a sender of the electronic communication, an IP address of the electronic communication, etc.). In some implementations, app server 230 may identify a secondary attribute associated with the electronic communication (e.g., a country of origin) based on information stored by instruction field 422.

In some implementations, app server 230 may identify the attributes based on receiving and storing the electronic communication. Alternatively, app server 230 may identify the attributes without storing the electronic communication (e.g., app server 230 may receive a header, associated with the electronic communication, and may identify the attributes based on information included in the header, such as a size of the electronic communication, a sender of the electronic communication, a subject of the electronic communication, an IP address associated with the electronic communication, etc.).

Process 500 may also include forming display data for the electronic communication (block 540). For example, as described above with respect to display data field 430, app server 230 may determine a display instruction for the electronic communication based on the attributes of the electronic communication, the weighting information and/or the rules information. As described above, the display instruction may direct user device 210 to display the electronic communication in a particular manner in a user interface of user device 210. In some implementations, app server 230 may form display data by mapping an ID of the electronic communication with the attributes of the electronic communication, with the weight value of the electronic communication, and/or with the display instructions of the electronic communication. In some implementations, the display data may correspond to information stored by display data field 430. In some implementations, the display data may be based on default weighting information and default rules information provided by an operator of app server 230 (e.g., in a scenario where user device 210 has not provided the weighting information and/or the rules information). Additionally, or alternatively, the display data may be based on weighting information and rules information provided by a user of user device 210. Additionally, or alternatively, the display data may be based on weighting information obtained by performing a social network analysis, as described above.

Process 500 may further include updating the rules information (block 550). For example, app server 230 may update the rules information based on applying a rule to a particular electronic communication. As an example, assume that rules information field 420 stores a rule to direct app server 230 to identify an image corresponding to a particular domain. Given this assumption, app server 230 may update the rules information to attach the identified image to subsequent received electronic communications associated with the particular domain.

Process 500 may also include a graphical representation of the electronic communication to be displayed (block 560). For example, app server 230 may provide the display data to user device 210. In some implementations, user device 210 may receive the display data and may display a representation of the electronic communication (or multiple electronic communications) in a user interface of user device 210 in accordance with the display data. Alternatively, user device 210 may determine the display data and display the graphical representation of the electronic communication in a user interface of user device 210.

In some implementations, the user interface may be associated with an application (or an add-on or a plug-in to an application) executing on user device 210 used to display electronic communications and/or information representing electronic communications. An example of a user interface for displaying information representing multiple electronic communications is described above with respect to FIG. 1. Some additional examples of the user interface are described below with respect to FIGS. 6 and 7.

Process 500 may further include receiving user input via a user interface and updating display data based on the user input (block 570). In some implementations, a user of user device 210 may provide, to app server 230, updates to the display data (including updates to weighting information and/ or rules information) by interacting with a user interface of user device 210. For example, the user may relocate an icon representative of an electronic communication or representative of a group of electronic communications from a particular location of the interface to another location of the interface (e.g., by dragging the icon from one location of the interface to another location of the interface).

In some implementations, the relocation of the icon may represent a change in weighting information (e.g., relocating the icon from the top of the interface to the bottom of the interface may reduce the score value or importance of the electronic communication associated with the icon). In some implementations, app server 230 may store the updates to the weighting information and/or the rules information when the updates are received via user interaction with the user interface. Additionally, or alternatively, weighting information may be updated independently of user interaction. For example, app server 230 may update the weighting information for electronic communications having particular content (e.g., particular content relating to a high priority announcement, such as an emergency announcement, a company announcement, etc.). In some implementations, app server 230 may receive an instruction to increase a weighting score for electronic communications having the particular content.

While a particular series of blocks has been described above with regard to FIG. 5, the operations, data flows, and/or the order of the blocks may be modified in other implementations. Further, non-dependent operations and/or data flows may be performed in parallel. Also, while process 500 is described as being performed by app server 230, in practice, some or all of process 500 may be performed by user device 210. For example, a software application of user device 210 may form display data based on weighting/rules information and/or attributes of an electronic communication to display information representing the electronic communication in a user interface of user device 210. Further, user device 210 may update display data based on receiving user input via the user interface.

Figure 6:
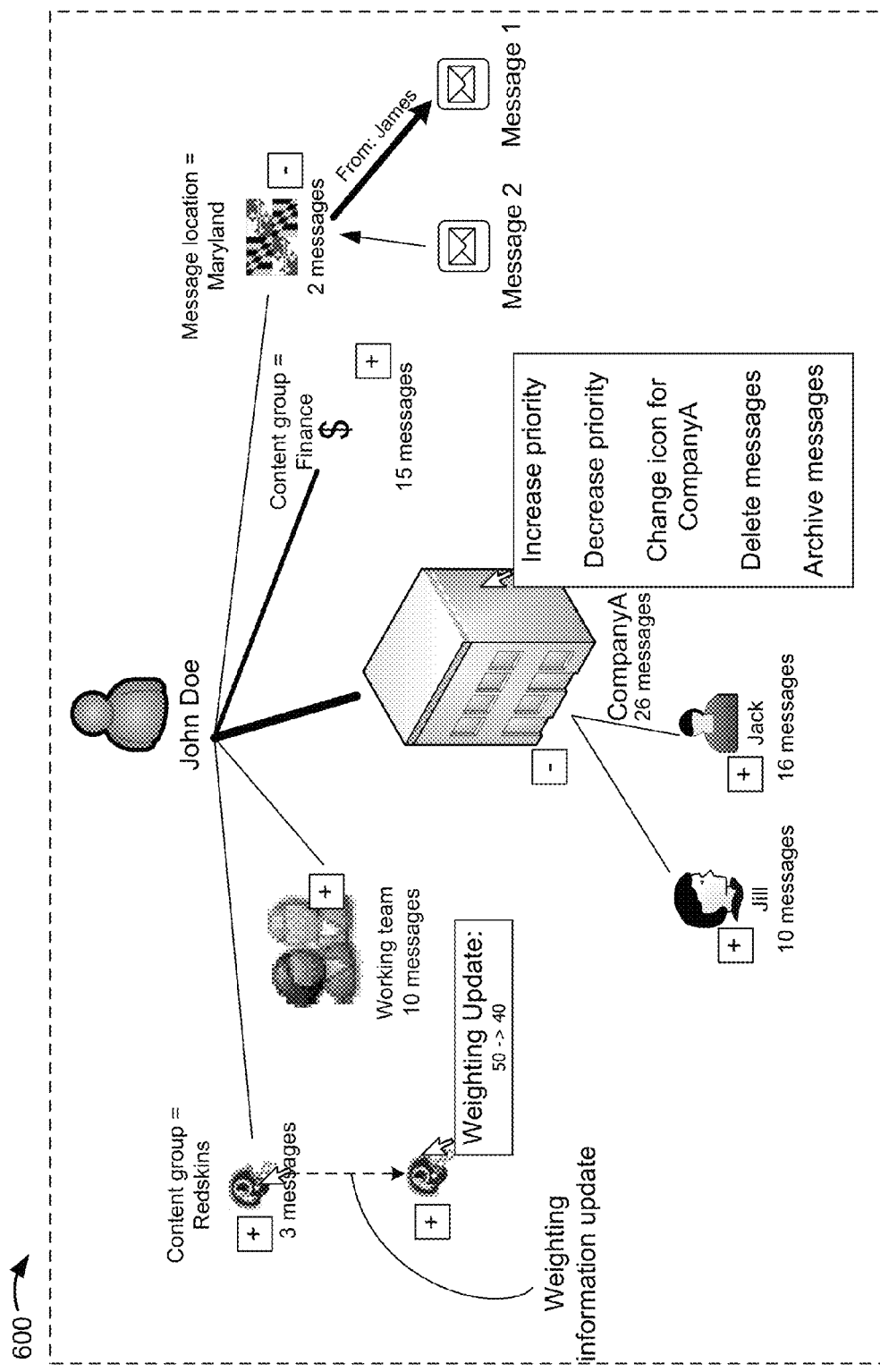
FIG. 6 illustrates an example implementation as described herein.

FIG. 6 illustrates an example implementation as described herein. In some implementations, FIG. 6 may illustrate an example interface 600 of user device 210 having information representing multiple electronic communications displayed in a graphical manner. In FIG. 6, assume that the information representing electronic communications of interface 600 are associated with the user "John Doe." As shown in FIG. 6, interface 600 may include an image or an icon representative of the user and may include links connecting the icon of the user to multiple icons representing different groups of electronic communications.

As described above, the electronic communications may be grouped based on having similar attributes, such as electronic communications relating to a common subject or having similar content (e.g., electronic communications relating to a particular sports team or a particular subject, such as finance). Additionally, or alternatively, the electronic communications may be grouped based on a particular distribution list (e.g., electronic communications relating to the distribution list "working team"), based on a particular domain of a particular company (e.g., electronic communications received from the company "companyA"), based on a particular geographic location (e.g., electronic communications sent from a particular city, state, country, street address, or other geographic location) or based on some other factor. In some implementations, (e.g., when a particular electronic communication includes attributes that correspond to multiple groups) an icon representing the particular communication may be displayed in the multiple groups with an indication that the particular communication is associated with the multiple groups.

As shown in FIG. 6, interface 600 may include icons representative of different groups of electronic communications. For example, interface 600 may include a company logo, a sports team logo, a flag associated with a geographic location, a currency symbol representing electronic communications associated with the subject of finance, an image of a particular sender, etc. In some implementations, the size of the icon for a group of electronic communications may be proportional to the number of electronic communications in the group and/or proportional to the importance of the electronic communications (e.g., based on a cumulative score value of the electronic communications in the group). In some implementations, a thickness of the link connecting the icon of the user and the icon of a group or icon of an electronic communication may be proportional to the number of electronic communications in the group and/or proportional to the importance of the electronic communication. In some implementations, a color or style of the link (e.g., a solid link, a dashed link, a dotted-dashed link, or some other style) may represent an attribute of the electronic communications and/or an attribute of a group associated with the electronic communication.

In some implementations, a link may include an arrow indicating whether an electronic communication was sent to the user or sent from the user. In some implementations, a color of text identifying an electronic communication or a color of text identifying a group of electronic communications may vary for different electronic communications or different groups. In some implementations, an icon representing a group, a subgroup, or electronic communication may include a warning logo to identify a potentially hazardous electronic communication (e.g., a fraudulent electronic communication, an electronic communication containing a virus, etc.).

As described above, the user may interact with interface 600 to provide updates to weighting information and/or rules information. For example, as shown in interface 600, the user may drag an icon, representative of electronic communications associated with a sports team, from one location of interface 600 to another location of interface 600. In some implementations, the relocation of the icon may cause app server 230 to update the weighting information. In the example shown in FIG. 6, the user may modify a score value (e.g., the importance or priority) of electronic communications associated with a particular sports team by dragging the icon representing the group of electronic communications associated with the particular sports team from one location of interface 600 to another location of interface 600 (e.g., the score value may be lowered when the icon is dragged down in interface 600 or the score value may be increased when the icon is dragged up in interface 600). As shown in FIG. 6, the update to the weighting information (e.g., the update to the score value) may be presented as the icon is relocated from location to another location. In some implementations, the score value may remain constant when the icon is dragged laterally, or the score value may be modified in some other manner when the icon is dragged laterally.

In some implementations, the score value of an electronic communication may be updated when the score value of another electronic communication having similar attributes is updated. For example, assume that a user of user device 210 interacts with interface 600 to update the score value of an electronic communication or group of electronic communications (e.g., by dragging an icon representing the electronic communication and modifying the position of the icon on interface 600). Given this assumption, app server 230 may update the score value of another electronic communication having similar attributes, thereby updating corresponding display data as a result of the updated score value. In some implementations, the updated display data may cause user device 210 to display the other electronic communication in an updated location on interface 600.

Additionally, or alternatively, a user of user device 210 may update the weighting and/or the rules information by specifying the values stored by weighting information field 410 and/or by specifying the instructions in rules information field 420. In some implementations, interface 600 may display the electronic communications based on the updated weighting information and/or rules information. For example, the position of the icons may be updated when the user of user device 210 updates the information stored by weighting information field 410 and/or rules information field 420.

As further shown in FIG. 6, a user may interact with interface 600 to expand and/or collapse a group to display or hide corresponding information representing electronic communications and/or subgroups associated with the group. For example, a user may select the "+" icon to expand or display information representing electronic communications or subgroups associated with a group. Similarly, the user may select the "-" icon to collapse or hide information representing electronic communications or subgroups associated with the group. In the example of FIG. 6, interface 600 may display a group, such as "CompanyA" corresponding to electronic communications and/or subgroups associated with CompanyA. As shown in FIG. 6, CompanyA may include subgroups displayed below an associated group, such as individual senders (e.g., Jill and Jack) associated with CompanyA. In some implementations, the subgroups may include additional subgroups and/or electronic communications. In some implementations, a subgroup may have a score value corresponding to an average score value of electronic communications associated with the subgroup. In some implementations, multiple subgroups may be displayed in order of score value (e.g., a higher scored subgroup may be displayed higher in interface 600 than a lower scored subgroup).

As further shown in FIG. 6, a user may interact with interface 600 to modify the display of information representing electronic communications or to delete electronic communications. For example, interface 600 may present a drop-down menu to allow the user to modify the weighting information (e.g., by increasing or decreasing the priority of an electronic communication or a group) and/or the rules information (e.g., by modifying the icon for an electronic communication or group, modifying a thickness of a connecting link, etc.). In some implementations, the drop-down menu may allow the user to delete an electronic communication, archive an electronic communication, move the electronic communication, or perform some other action associated with the electronic communication. As described above, app server 230 may save updates to display data based on receiving updates via user interaction with interface 600.

In some implementations, the user may interact with interface 600 to combine electronic communications into a single group. For example, a user may select an icon representing an electronic communication and drag the icon to another icon representing another electronic communication to group the two electronic communications together. In another example, the user may draw a link between the two icons to group the two electronic communications together. In some implementations, a link may include a label to indicate an attribute of an electronic communication (e.g., a label that identifies a sender of the electronic communication, a recipient of the electronic communication, a subject of the electronic communication, content of the electronic communication, etc.). In some implementations, a user may input the label by selecting the link and adding the label. Additionally, or alternatively, the label may be based on a rule that a user of user device 210 or a user of app server 230 may set (e.g., a rule to add a particular label to links connecting icons representing electronic communications having particular attributes).

In some implementations, app server 230 may identify common attributes between the two electronic communications and may update rules information and/or weighting information such that subsequent electronic communications having the common attributes may be grouped. In some implementations, the user may interact with interface 600 to receive an electronic communication. For example, the user may select an icon representing a particular electronic communication to direct user device 210 to communicate with electronic communication server 220 and/or app server 230 to receive the electronic communication associated with the icon.

While a particular example is shown in FIG. 6, it will be apparent that the above description is merely an example implementation. While FIG. 6 shows a particular format of an interface for displaying electronic communications in a graphical format, interface 600 shown in FIG. 6 is merely an example and, in practice, interface 600 may contain different information and/or may have a different format that what is shown in FIG. 6.

Figure 7:
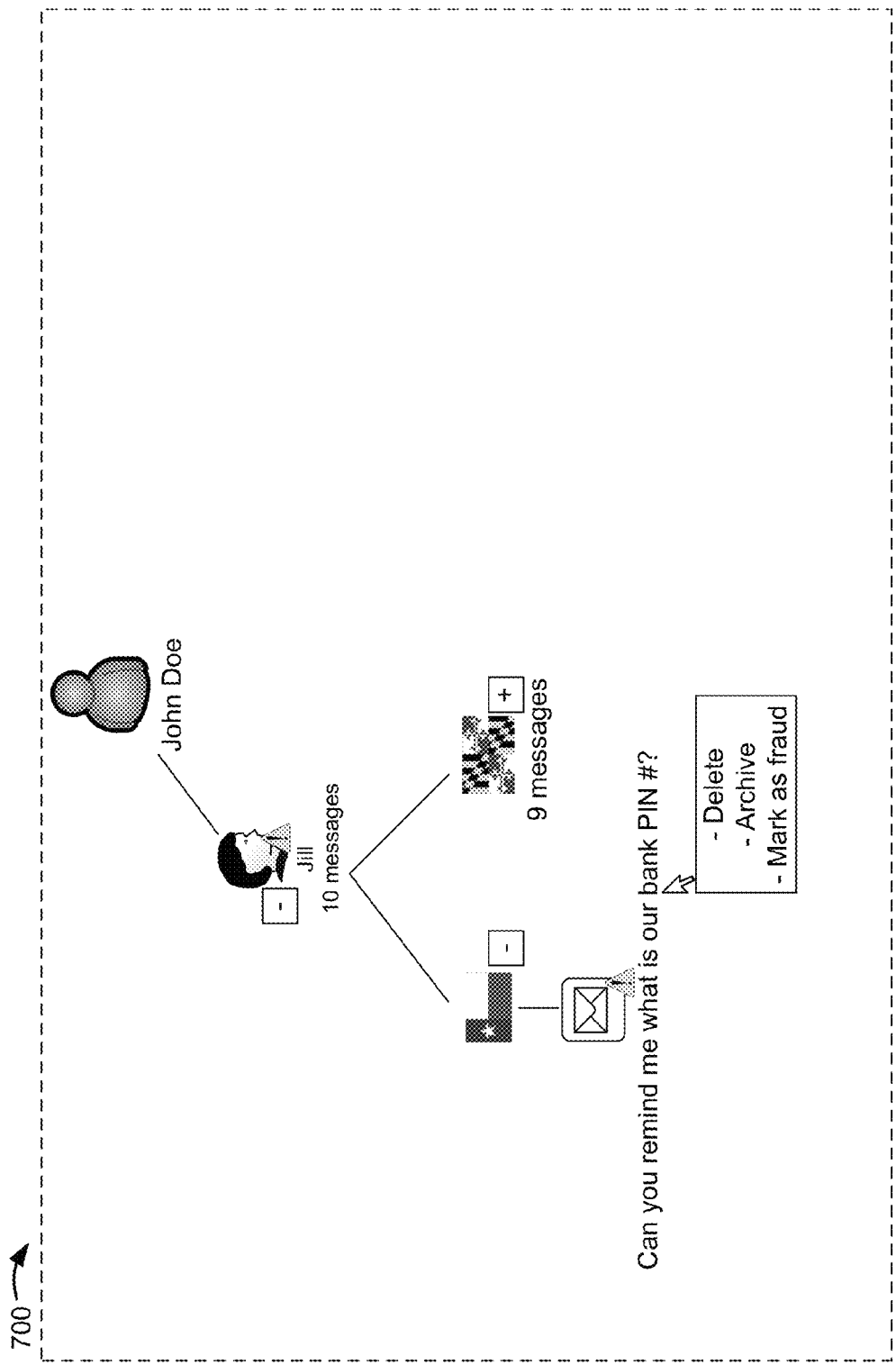
FIG. 7 illustrates an example use-case for detecting a fraudulent electronic communication.

FIG. 7 illustrates an example use-case for detecting a fraudulent electronic communication. FIG. 7 illustrates an interface 700 of user device 210 associated with the user "John Doe." Similar to interface 600 in FIG. 6, interface 700 may display information representing electronic communications and/or groups of electronic communications in a graphical manner. As shown in interface 700, a link from an icon representing the user "John Doe" may connect to an icon representing a sender of a group of electronic communications (e.g., the sender "Jill"). As further shown in interface 700, a link may connect the icon representing the sender "Jill" to an icon representing a geographic location (e.g., an icon representing the state of Texas) from which an electronic communication was sent (e.g., based on a domain or IP address from which the electronic communications were sent). Another link may connect the icon representing the sender "Jill" to an icon representing another geographic location (e.g., the state of Maryland) from which electronic communications were sent. That is, interface 700 may display electronic communications by sender and by geographic locations from which the sender sent the electronic communications.

In FIG. 7, assume that the state of Maryland is designated as a home or expected location for the sender "Jill." Given this assumption, interface 700 may identify and mark electronic communications received by the sender "Jill" when the electronic communications were sent from a geographic location other than the state of Maryland. For example, as shown in FIG. 7, interface 700 may display an icon representing an electronic communication with a warning icon to alert the user of interface 700 that the electronic communication was sent from a geographic location other than the state of Maryland. In some implementations, interface 700 may display a drop-down menu to allow the user to select to delete the electronic communication, archive the electronic communication, or perform some other action on the electronic communication. In some implementations, the user may select to mark the electronic communication as a fraudulent electronic communication. In some implementations, marking the electronic communication as fraudulent may update rules information stored by data structure 400 such that subsequent electronic communications with similar attributes may be automatically marked as fraud.

As shown in interface 100, interface 600, and interface 700, and as described above, a user may identify and organize electronic communications in a graphical manner, thereby creating a visual representation of the user's electronic communications. Further, the user may interact with a user interface to customize the display and presentation of information representing electronic communications, thereby allowing the user to manage, identify, and/or organize electronic communications more effectively than when electronic communications are presented in a list or text format.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by one or more devices, information associated with a plurality of electronic communications intended for a user;
identifying, by the one or more devices, attributes of the plurality of electronic communications;
determining, by the one or more devices and based on the attributes, display data for the plurality of electronic communications; and
causing, by the one or more devices and based on the display data, a graphical display of icons, arranged in a particular graphical structure in which the icons are connected via links, to be displayed,
the icons including:
a first icon that represents the user,
a second icon corresponding to a first representation of a first electronic communication of the plurality of electronic communications,
a third icon corresponding to a second representation of a second electronic communication of the plurality of electronic communications, and
a fourth icon corresponding to an attribute, of the attributes, that is common to the first electronic communication and the second electronic communication.

2. The method of claim 1, further comprising:
receiving a user input,
the user input corresponding to a modification to the display data;
modifying the display data based on the user input; and
causing the graphical display to be modified based on the modified display data.

3. The method of claim 1, where the fourth icon comprises at least one of an image of a sender of the first electronic communication and the second electronic communication, an image of a logo corresponding to a domain associated with the first electronic communication and the second electronic communication, or an image representative of a geographic location from which the first electronic communication and the second electronic communication originated.

4. The method of claim 1, where a link, of the links, connected to the second icon includes a thickness proportional to a size of the first electronic communication.

5. The method of claim 1, where the attribute corresponds to a sender of the first electronic communication and the second electronic communication, a domain associated with the first electronic communication and the second electronic communication, an internet protocol (IP) address associated with the first electronic communication and the second electronic communication, a geographic location associated with the first electronic communication and the second electronic communication, or a content of the first electronic communication and the second electronic communication.

6. The method of claim 1, further comprising:
receiving at least one of weighting information or rules information,
where determining the display data is further based on the at least one of the weighting information or the rules information.

7. The method of claim 6, where the rules information identifies an image associated with the first icon representing the user.

8. The method of claim 1, further comprising:
assigning priorities to the plurality of electronic communications based on at least one of weighting information, rules information, or content associated with the plurality of electronic communications,
the second icon and the third icon being presented within the graphical display to visually indicate the priorities of the plurality of electronic communications.

9. A system comprising:
one or more devices, implemented at least partially in hardware, to:
receive information associated with a plurality of electronic communications intended for a user;
identify attributes of the plurality of electronic communications;
determine, based on the attributes, display data for the plurality of electronic communications; and
cause, based on the display data, icons to be displayed in a particular graphical structure in which the icons are connected via links, the icons including:
a first icon that represents the user,
a second icon corresponding to
a first electronic communication of the plurality of electronic communications,
a third icon corresponding to a second electronic communication of a plurality of electronic communications, and
a fourth icon corresponding to an attribute, of the attributes, that is common to the first electronic communication and the second electronic communication.

10. The system of claim 9,
where the one or more devices include a user device, and
where the icons are presented on a display screen associated with the user device.

11. The system of claim 9,
where the one or more devices include a server device that communicates with a user device, and
where the icons are presented on a display screen associated with the user device.

12. The system of claim 9, where the attribute corresponds to a sender of the first electronic communication and the second electronic communication, a domain associated with the first electronic communication and the second electronic communication, an internet protocol (IP) address associated with the first electronic communication and the second electronic communication, a geographic location associated with the first electronic communication and the second electronic communication, or content of the first electronic communication and the second electronic communication.

13. The system of claim 9,
where the one or more devices are further to:
receive weighting information, and
where, when determining the display data, the one or more devices are to:
determine the display data based on the attributes and the weighting information.

14. The system of claim 9, where the one or more devices are further to:
assign priorities to the plurality of electronic communications based on at least one of weighting information, rules information, or content associated with the plurality of electronic communications,
the second icon and the third icon being presented in a manner to visually indicate the priorities of the plurality of electronic communications.

15. A non-transitory computer-readable medium storing instructions, the instructions comprising:
a plurality of instructions which, when executed by one or more processors, cause the one or more processors to:
receive information associated with a plurality of electronic communications intended for a user;
identify attributes of the plurality of electronic communications;
determine, based on the attributes, display data for the plurality of electronic communications; and
cause, based on the display data, icons, arranged in a particular graphical structure in which the icons are connected via links, to be displayed,
the icons including:
a first icon that represents the user,
a second icon corresponding to a first electronic communication of the plurality of electronic communications,
a third icon corresponding to a second electronic communication of a plurality of electronic communications, and
a fourth icon corresponding to an attribute, of the attributes, that is common to the first electronic communication and the second electronic communication.

16. The non-transitory computer-readable medium of claim 15, where the plurality of instructions further cause the one or more processors to:
receive a user input
the user input corresponding to a modification to the display data; and
modify the display data based on the user input.

17. The non-transitory computer-readable medium of claim 15, where the fourth icon comprises an image representative of a geographic location associated with the first electronic communication and the second electronic communication.

18. The non-transitory computer-readable medium of claim 15, where the attribute corresponds to a sender of the first electronic communication and the second electronic communication, a domain associated with the first electronic communication and the second electronic communication, an IP address associated with the first electronic communication and the second electronic communication, a geographic location associated with the first electronic communication and the second electronic communication, or content of the first electronic communication and the second electronic communication.

19. The non-transitory computer-readable medium of claim 15, where a link connected to the second icon includes a thickness proportional to a value that represents an importance of the first electronic communication.

20. The non-transitory computer-readable medium of claim 15, where the plurality of instructions further cause the one or more processors to:
assign priorities to the plurality of electronic communications based on at least one of weighting information, rules information, or content associated with the plurality of electronic communications,
the second icon and the third icon being presented based on the priorities of the plurality of electronic communications.

* * * * *